May 8, 1956   P. H. BORDEN   2,744,318
RAZOR BLADE CHANGING MECHANISM
Original Filed Feb. 15, 1950   5 Sheets-Sheet 1

Inventor
PHILIP H. BORDEN
By Weatherford and Weatherford
Attorneys

May 8, 1956 P. H. BORDEN 2,744,318
RAZOR BLADE CHANGING MECHANISM
Original Filed Feb. 15, 1950 5 Sheets-Sheet 3

Inventor
PHILIP H. BORDEN
By Weatherford and Weatherford
Attorneys

May 8, 1956 P. H. BORDEN 2,744,318
RAZOR BLADE CHANGING MECHANISM
Original Filed Feb. 15, 1950 5 Sheets-Sheet 4

Inventor
PHILIP H. BORDEN
By Weatherford and Weatherford
Attorneys

May 8, 1956 P. H. BORDEN 2,744,318
RAZOR BLADE CHANGING MECHANISM
Original Filed Feb. 15, 1950 5 Sheets-Sheet 5

Inventor
PHILIP H. BORDEN
By Weatherford and Weatherford
Attorneys

United States Patent Office 2,744,318
Patented May 8, 1956

2,744,318
RAZOR BLADE CHANGING MECHANISM

Philip H. Borden, Orange, Conn., assignor to Central Industrial Corporation, Memphis, Tenn., a corporation of Tennessee Continuation of application Serial No. 144,278, February 15, 1950. This application March 23, 1953, Serial No. 343,952

19 Claims. (Cl. 30—40)

This invention relates to certain new and useful improvements in safety razor equipment and particularly relates to a combination of devices for supporting razor blades and automatically effecting exchange of razor blades as desired.

This application is a continuation of my co-pending application, Serial No. 144,278, filed February 15, 1950; it is also a continuation-in-part of my co-pending application, Serial No. 61,811, filed November 24, 1948, abandoned in view of continuation application Serial No. 343,951, filed March 23, 1953, now Patent No. 2,708,309, granted May 17, 1955.

The devices involved consist generally of a razor blade-supporting head having releasable blade engaging means and a handle, a casing adapted to cooperate with the razor head and effect release and subsequent re-engagement of the blade engaging means, and a blade stripping and feeding mechanism housed within the casing and adapted to strip a released blade from, and supply a new blade to, the blade supporting head, the three devices cooperating to effect the basic purpose of the invention.

The principal object of the invention is to provide a razor supporting head and handle, a casing and a blade changing mechanism consisting of blade stripping means and blade feeding means of the general character described.

A further object of the invention is to provide a blade changing mechanism including blade stripper means and blade feeding means for removing a blade from the razor blade-supporting head and placing a new blade thereon.

A further object of the invention is to provide such a blade changing mechanism in which the stripping means and the blade feeding means are arranged to be successively contacted by a razor blade-supporting head during movement of said head in a single direction relative to the changer.

A further object of the invention is to provide a casing adapted to cooperate with the blade engaging means of a razor blade-supporting head to effect release and subsequent re-engagement of said means during movement of said head in a single direction relative to said casing.

A further object of the invention is to provide such a casing adapted to house a blade changing mechanism of the character described for engagement with a razor blade supporting head moved in a single direction relative to said casing.

A further object of the invention is to provide such a casing which is adapted to removably receive a blade changing mechanism.

A further object of the invention is to generally improve the design, utility and efficiency of blade changing mechanisms for use with safety razors.

The means by which the foregoing and other objects of this invention are accomplished and the manner of their accomplishment will readily be understood from the following specification upon reference to the accompanying drawings, in which.

Referring now to the drawings in which the various parts are indicated by numerals, it will be seen, as pointed out above, that the invention preferably relates to equipment for use with double edge razor blades, although it is not limited thereto, and essentially incorporates three devices, namely, a blade carrying razor head 26 and a handle 27, a blade changing mechanism 28, including blade stripper means and blade feeder means, and a casing 29 for housing the blade changing mechanism and for effecting blade release from the razor head.

Razor head 26 includes an underplate 31 which is provided with a substantially flat upper surface adapted to support a razor blade 32 which preferably is provided with a pair of apertures 33 arranged in alined spaced relation substantially midway between the front and rear blade cutting edges and equally and oppositely spaced from the front to rear midline of such blade. Blades 32 are also preferably notched as at 34 on their opposite sides. The blade supporting face of underplate 31 is of slightly less width between its front and rear edges than the width of blade 32 in order to provide for the projection of the blade cutting edges beyond the edges of the supporting face, and plate 31, along the front and rear edges of the blade supporting face, is downwardly rolled to provide guard bars 35, plate 31 preferably being cut out and further folded along the front and rear edges of the blade supporting face to provide slots 36, underlying the respective cutting edges of a supported blade 32 and above the respective guard bars 35, and depending front and rear flanges 37. At its opposite sides plate 31 is downwardly turned to form depending side flanges 38 which are stamped out as at 39 to provide pivot bars 41 which extend transversely of plate 31.

Razor head 26 is provided at its opposite sides with releasable clamps 43 adapted to clampingly engage side portions of a blade 32 supported on plate 31 and to be rocked to outward release position out of engagement with such supported blade to effect release thereof, in order to permit removal of the blade from the supporting head. Each clamp 43 includes a transversely extending blade-engaging member 45, which, in the form illustrated in Figs. 1 to 6, includes an upper portion and a depending flange 47 angularly joined to the upper portion, flange 47 being vertically disposed normally in edge abutment along its lower edge with the upper face of a supported blade 32. Preferably the blade-engaging portion 45, including flange 47 extends transversely throughout a majority of the width of blade 32 and the angularly joined portions cooperate to form an operating element of angular cross section, spaced above pivot 41 and particularly adapted for effecting rocking, release movement of the clamps in the manner hereinafter described. At its front and rear member 45 is preferably provided with blade-engaging fingers 48 which project respectively forwardly and rearwardly from member 45 and downwardly into contact with the upper face of blade 32 adjacent the corners thereof, corner engaging fingers 48 preferably each including a terminal portion adapted to overlie the edge of the blade adjacent its corner to effect further engagement therewith. From the outer edge of the upper portion of member 45 a downwardly extending outer portion 49 is provided which depends below flange 38 of plate 31 and terminates in an inwardly turned seat portion 50 which underlies the end of plate 31. At the forward and rearward ends of seat portion 50 are respectively formed upstanding tabs 51 which are apertured and are turnably mounted upon and supported by pivot bar 41.

Figure 1:
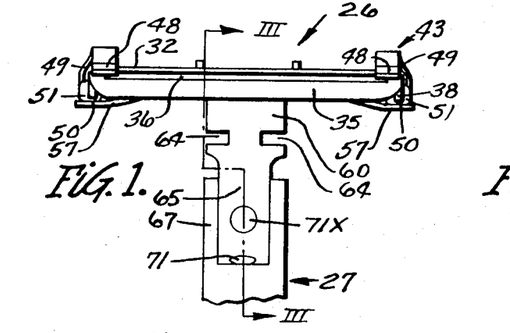
Fig. 1 is a front view of the preferred form of razor blade-supporting head of the invention with the upper fragment of the handle shown attached thereto.
Figure 2:
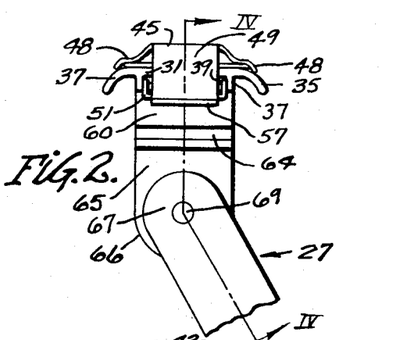
Fig. 2 is a side or end elevational view of the device shown in Fig. 1.

Preferably the elements comprising the clamp 43 are integrated in a unitary assembly, although it is obvious that individual parts may be employed and otherwise connected without departing herefrom. It will be seen that by the mounting of clamp 43 upon pivot bar 41 through the medium of apertured tabs 51 the clamps may be rocked from a normal position in which portions 45 and 48 respectively engage the upper face of the supported blade, as shown in Figs. 1 and 4, to an outer position in which the clamping engagement of the blade is released, as shown in Fig. 6.

Figures 3, 4, 5, 6, 7, 8, 9:
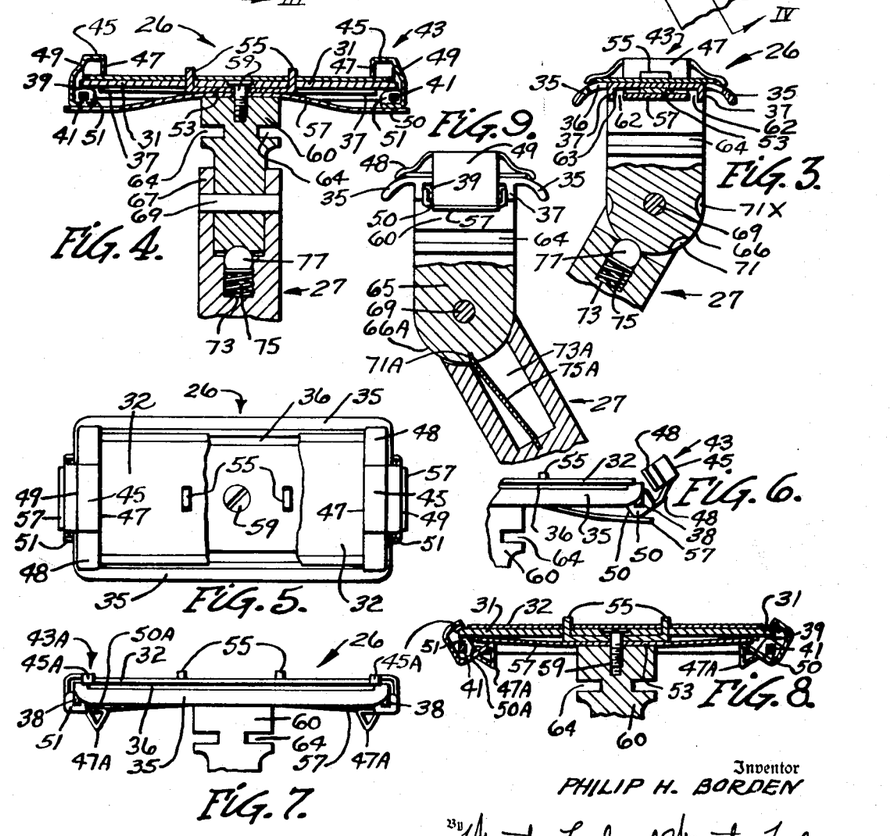
Fig. 3 is a sectional elevational view taken on the line III—III of Fig. 1.
Fig. 4 is a transverse sectional view taken on the line IV—IV of Fig. 2.
Fig. 5 is a top plan view of the razor blade-supporting head and a blade supported thereon with a portion of the blade broken away for purposes of illustration.
Fig. 6 is a fragmentary front elevational view of one end of the razor blade-supporting head illustrating the blade engaging means in released position.
Fig. 7 is a view similar to Fig. 1 illustrating a variation in releasable blade engaging means.
Fig. 8 is a view similar to Fig. 4 illustrating the variation of Fig. 7 with the blade engaging means in released position.
Fig. 9 is a view similar to Fig. 3 illustrating a variation in the head positioning means.
Figures 5A, 16:
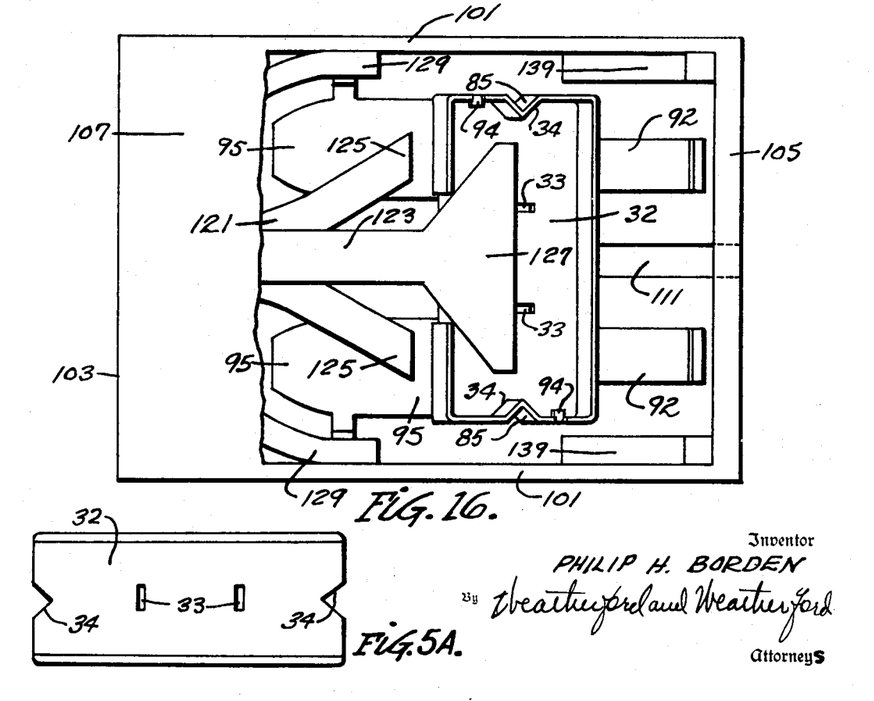
Fig. 5A is a top plan view of a preferred form of razor blade.
Fig. 16 is an inverted plan view of the device as shown in Fig. 15 with a portion of the floor of the casing removed for purposes of illustration.
Figure 10:
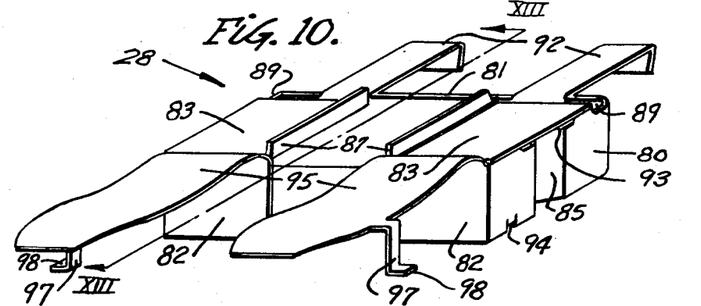
Fig. 10 is a perspective view of the blade changing mechanism of the invention.

In the variation illustrated in Figs. 7 and 8, a razor head 26 is shown as provided with side clamps 43A which each include an inwardly projecting blade engaging portion 45A, an outer portion 49A connected to the outer edge of the blade engaging portion 45A and an inwardly projecting seat portion 50A underlying the end of plate 31, the seat portion 50A being provided with tabs 51 which engage pivot bars 41 in the manner already described. A lug portion 47A, consisting of an angularly formed member, preferably of substantially triangular cross section, connected to the inner end of seat portion 50A, and spaced from pivot 41, is provided for the operation of the clamps, inward movement of lug portions 47A effecting outward rocking of clamps 43A about pivots 41 to the blade release position illustrated in Fig. 8. Preferably the blade-engaging portion 45A includes corner engaging fingers substantially similar in arrangement and function to the fingers 48 heretofore mentioned.

A yoke-like member 53, carrying at its opposite sides upstanding studs 55, underlies and is seated against the under side of the central portion of plate 31 with studs 55 projecting upwardly through suitable apertures formed in plate 31, the studs being spaced similarly to the spacing of blade apertures 33 and adapted to extend into and through apertures 33 to limit movement of blade 32 relative to head 26. A leaf spring member 57 underlies and is seated against yoke 53 and extends from side to side of head 26, underlying plate 31. At its outer ends spring 57 bears against the underside of clamp seat portions 50, urging movement of clamps 43 about pivots 41 into normal clamping engagement with plate 31 or a blade 32 carried thereby, or the spring may be inverted for use with clamps 43A and bear against the upper sides of seat portions 50A, similarly urging clamps 43A into clamping engagement. Plate 31, yoke 53 and spring 57 are centrally apertured to receive a suitable attaching member, such as screw 59, by which the parts are attached to the top of a neck 60, by which head 26 is supported for use. The top of neck 60 is preferably formed with a flat, intermediate face 61 which bears tightly against the under side of leaf spring 57, and front and rear ribs 62 which are parallel to and are respectively set off rearwardly and forwardly from the front and rear edges of neck 60 forming front and rear shoulders 63. Ribs 62 are spaced apart to receive spring 57 therebetween respectively engaging the front and rear edges of the spring to prevent forward or rearward relative movement between spring 57 and neck 60. Depending front and rear flanges 37 of plate 31 respectively engage ribs 62 along their outer faces and prevent relative forward and rearward movement between plate 31 and neck 60. Preferably the lower edge of flanges 37 seat on shoulders 63 and the upper edges of ribs 62 bear against the under side of plate 31, so that when attached as by screw 59 the parts are maintained in rigid attached relation.

Below the level of the depending portions of head 26, neck 60 is preferably provided with a pair of guide notches 64 which are respectively formed in the opposite sides of neck 60, and which extend from front to rear, are alined longitudinally below plate 31 and arranged in parallelism therewith. Guide notches 64 are adapted to engage cooperating guiding means, to support and guide head 26 during sliding movement thereof. Below notches 64, neck 60 is provided with a lower portion 65, the sides of which are flat and the front and rear of which merge into an arcuate lower face 66. Lower portion 65 is embraced on opposite sides by upstanding ears 67 of handle 27, lower portion 65 being connected to ears 67 as by a pin 69 for forward and rearward rocking movement. Lower face 66 is preferably formed along an arc of approximately one hundred eighty degrees formed about pin 69 as a center, and face 66 is provided with a plurality of outwardly facing recesses 71 which are preferably equally spaced apart along face 66. Below ears 67, handle 27 is chambered as at 73, the chamber housing a compression spring member 75 and a ball 77, ball 77 being urged outwardly of chamber 73 by spring 75 and being moved into yieldable engagement with one of recesses 71 when such recess is moved into register therewith upon rocking movement of the head and neck relative to the handle.

It will be seen that in the head and handle attachment illustrated in Figs. 1, 2, 3 and 4, head 26 and rigidly attached neck 60 may be rocked relatively to handle 27, lower neck portion 65 moving between handle ears 67, ball 77 being depressed into chamber 73 against the action of spring 75 until a recess 71 is moved into register therewith when the action of spring 75 will force ball 77 into yielding engagement with such recess. In this manner head 26 may be positioned angularly relative to handle 27 and the selection of the position accurately indexed by the recesses 71 and the razor thus may be shifted to position a selected blade cutting edge in shaving position and retained in the selected position.

In the variation illustrated in Fig. 9, neck 60 is similarly attached to ears 67 by pin 69 for rocking movement. Positioning and retention of the head and neck in position is maintained by a spring member 75A, preferably a leaf spring, one end of which is fastened to the bottom of a chamber 73A formed in the handle and the opposite end of which is fixed in a recess or slot 71A formed in arcuate face 66A, recess 71A being positioned substantially on the vertical mid line of neck 60. It will be observed that spring 75A is of a length slightly in excess of the distance between slot 71A and the bottom of chamber 73A in rocked position of head 26 and is, therefore, kept flexed and constantly urges movement of the head toward a position of greater angularity relative to handle 27, being limited in such movement by the abutment of spring 75A against the interior of chamber 73A. It will be seen that in this variation head 26 may be rocked to effect shift from a position angular to handle 27, as illustrated in Fig. 9, to a position oppositely angular to handle 27, similar to the position shown in Fig. 3, in which the head will be disposed at an angle from alinement with handle 27 equal but opposite to the angle illustrated in Fig. 9. It will further be observed that spring 75A will be effective to complete the shift of the head during such rocking movement after the head has been moved by hand just beyond alinement with handle 27.

Blade changing mechanism 28 intermediate its length includes a magazine 79 adapted to receive and house a plurality of blades 32 in stacked relation, the magazine consisting of a pair of opposite side panels 80, a rear panel 81, front panel portions 82, and top closure members 83, the side, rear and front panels and the top being connected to form the magazine 79 which preferably has an open bottom for introduction of blades 32 into the housing. Side panels 80 are preferably indented as at 85 along their vertical mid-lines, indents 85 being adapted to engage blade notches 34 to prevent undesired longitudinal movement of the stacked blades 32 relative to the magazine. Top members 83 are respectively connected to the upper edges of side panels 80 and each extends inwardly substantially horizontally overlying the stacked blades and terminates in an upwardly projecting, longitudinally extending lip 87. Lips 87 are spaced apart transversely of changer 28 slightly in excess of the spacing of studs 55 to permit longitudinal movement of the studs between the lips with the central section of the housed blades 32 which includes blade apertures 33 underlying the space between the lips so as to position the blade apertures below the space between lips 87.

Top members 83 extend from front panel portions 82 rearwardly beyond side panel indents 85 but terminate forwardly of rear panel 81, terminating thus to leave a minor open space across the rear of the top of the magazine. Adjacent the rear edge of the top members 83 side panels 80 are shortened, as at 89, so as to space the top edge of the side panels adjacent their rear ends below the level of the underside of top members 83. Rear panel 81 is of a height equal to the height of the shortened rear end portions of side panels 80 and similarly lies below the level of the under side of top members 83. It will be observed that the spacing of the top edges of rear panel 81 and of the rear end portions of side panels 80 below the under side of top members 83 is equal to substantially twice the thickness of a blade 32 and that the arrangement of the parts just described cooperates to provide a rearward discharge opening 91 for the exit of successive blades 32 from magazine 79.

A pair of transversely spaced tongues 92 are attached at their forward ends to and lie above the upper edge of rear panel 81 and project rearwardly therefrom, each terminating in a downwardly turned rear end. The thickness of tongues 92 is positioned above the top edge of rear panel 81 and the tongues are positioned as partial obstructions in discharge opening 91 preferably limiting the size of that opening to substantially the thickness of a single blade 32, or, less than the thickness of two blades 32, so as to limit blade discharge to the single uppermost blade of stacked blades 32 housed within magazine 79 described and to position tongues 92 for sliding engagement with the lower face of a blade moved through the discharge opening. In order to permit desired longitudinal movement of the uppermost blade 32 side panels 80 are slotted as at 93 adjacent their upper edges, the slotting being slightly in excess of the thickness of a single blade 32 and effecting cut-off of the top of indents 85 adjacent the under side of top members 83 so as to free the uppermost blade of the stacked blades from the restraining engagement of its blade notches 34 by indents 85 when the uppermost blade is in contact with the underside of top members 83. Preferably the respective side walls 80 may be inwardly crimped as at 94 after stacked blades 32 have been introduced thereinto in order to limit downward movement of the blades relative to housing 79.

Preferably front panel portions 82 extend inwardly across the blade chamber and terminate with their inner ends spaced apart substantially equally to the spacing of the inner faces of lips 87. From the upper edges of the respective front panel portions 82 a pair of stripper bayonets 95 project forwardly, these bayonets being free at their forward ends. Preferably bayonets 95 are formed along undulant lines, being each provided with an upwardly arched portion adjacent the attachment of the bayonets to the front panel portions and having a depressed intermediate section and terminating at their forward ends in a slightly downwardly curved tip. Bayonets 95 along their inner edges are spaced apart, the spacing being substantially equal to the spacing of lips 87 and slightly in excess of the spacing of studs 55 to permit longitudinal movement of studs 55 therebetween. On their outer sides each bayonet 95 is provided with a depending anchor member 97, anchors 97 each terminating at their lower ends in an outwardly turned tab 98. Forwardly projecting bayonets 95 are adapted for insertion between the blade 32 and the supporting face of razor head 26 to effect separation of the blade from the head upon release of clamps 43 from clamping engagement with such blade and rearward longitudinal movement of razor head 26 over changer 28, the depressed intermediate portion of the bayonets being effective in accomplishing such separation. Due to the transverse spacing of the bayonets, studs 55 may pass freely therebetween during the rearward movement of the razor head, and as the razor head approaches the front panel portions 82 of magazine 79 it passes over the upwardly arched rear portion of bayonets 95 relative to top members 83, facilitating ease of continued rearward movement of the razor head onto the magazine. The razor head passes over the upwardly arched portions onto lips 87 with studs 55 extending downwardly between the lips and being enabled to engage the uppermost blade 32 when such blade is in contact with the underside of top members 83, studs 55 being enabled to enter apertures 33 of such topmost blade and to engage these apertures and thereafter move the uppermost blade rearwardly through discharge opening 91 and rearwardly over tongues 92. It will be seen that the studs are of such length that they will project below top members 83 no more than the thickness of a single blade 32. Such blade 32, removed by the razor head from the magazine housing, will then be retained upon the razor head upon re-engagement of clamps 43.

Casing 29 includes side walls 101, front wall 103, rear wall 105, floor 107, and cover 109, all of which are connected together to form a casing 29 which is adapted to receive and retain a changer 28 therewithin. Cover 109 is preferably formed of a pair of members rigidly attached at their outer edges to the tops of side walls 101 and extending horizontally inwardly therefrom, terminating with their inner edges spaced apart forming an elongated guide slot 111 extending from front to rear of the cover and adapted to receive neck 60 therebetween with guide notches 64 slidably engaging the inner edges of the cover members 109 and cooperating with the cover members to guide razor head 26, supported by neck 60, for longitudinal movement through casing 29. Front wall 103 extends between and at its opposite ends is rigidly secured to the respective side walls 101. The upper edge of front wall 103 is unattached and is spaced below cover members 109 to provide an entrance 113 onto the interior of casing 29, entrance 113 being of a size to receive and admit razor head 26 into the casing interior. The upper edge of rear wall 105 similarly is spaced below cover members 109 to provide an exit 115 from the interior of the casing adapted to permit withdrawal of razor head 26 from the casing interior.

Figures 11, 13, 14:
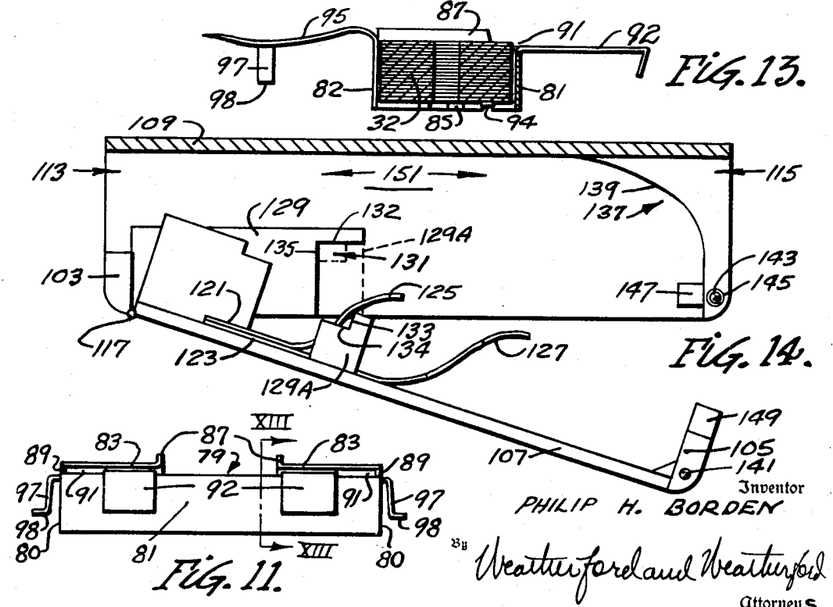
Fig. 11 is a rear end elevational view of the mechanism illustrated in Fig. 10.
Fig. 13 is a sectional view taken on the line XIII—XIII of Figs. 10 and 11.
Fig. 14 is a side view of one form of the casing of the invention with one of the sides removed for purposes of illustration.
Figure 12:
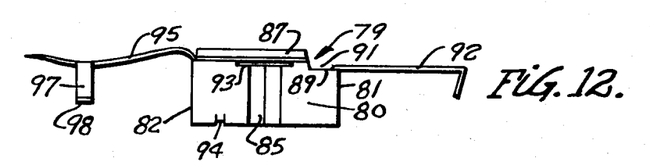
Fig. 12 is a side elevational view of the blade changing mechanism.
Figure 15:
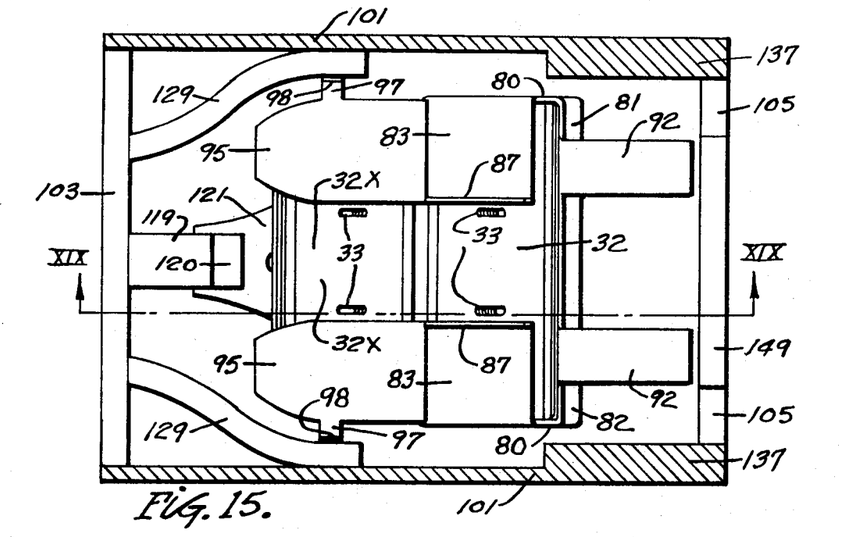
Fig. 15 is a sectional top plan view, taken as on the line XV—XV of Fig. 19, of the casing with the blade changing mechanism positioned therein.
Figure 17:
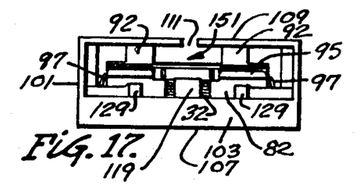
Fig. 17 is a front elevational view on a reduced scale of the casing and blade changing mechanism.
Figure 18:
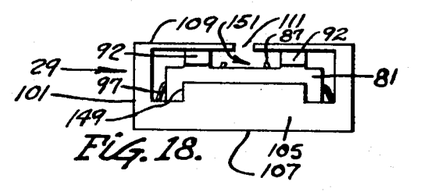
Fig. 18 is a rear end elevational view on a similar scale of the casing mechanism.
Figure 19:
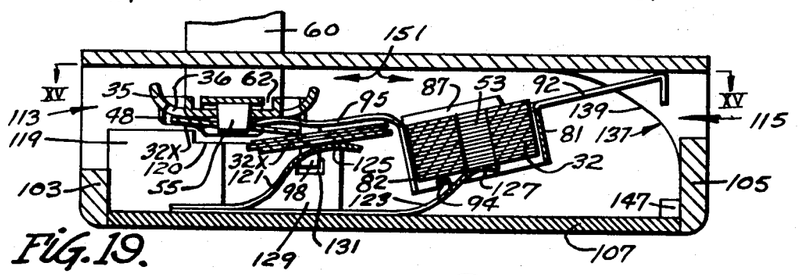
Figs. 19, 20, and 21 are respectively longitudinal sectional views taken as on the line XIX—XIX of Figs. 15, and 22 and illustrating relative positions of the respective devices during the blade changing operation.
Figure 20:
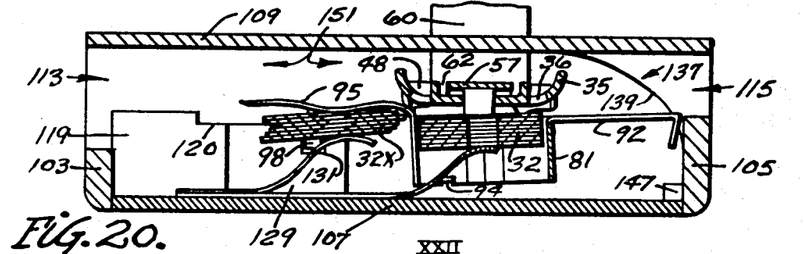
Figures 21, 22:
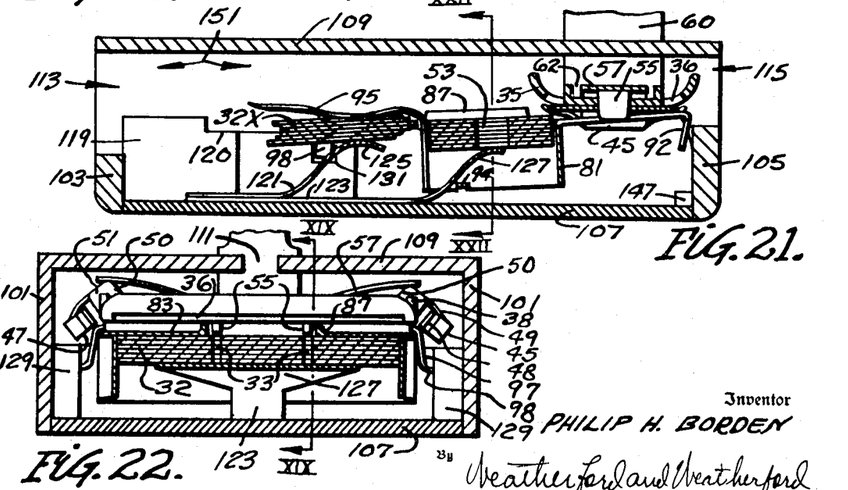
Fig. 22 is a transverse sectional view taken as on the line XXII—XXII of Fig. 21 illustrating the relative positions of the elements during the blade changing operation when the razor head is in a position intermediate the positions shown in Figs. 19, and 20.

Floor 107 is preferably a flat, horizontally disposed member which is of a size to extend between the lower ends of side walls 101 and from front wall 103 to rear wall 105. Floor 107 may be rigidly attached to the front, rear and side walls, as indicated in Figs. 19 to 21, or it may be hingedly attached as by hinge 117 to the lower end of front wall 103 as shown in Fig. 14. Adjacent the forward edge of floor 107 and positioned to abut the rear face of front wall 103 when the casing is assembled, is a block 119 mounted on the longitudinal midline of floor 107 and rigidly fixed thereto. Block 119 extends above the upper edge of front wall 103 and is of a width less than the spacing between studs 55 so that the studs may readily pass thereby during entrance of razor head 26 into the casing interior. The upper face of block 119 is provided with a stepped-down portion 120 adjacent its rear edge and the lower face of block 119 adjacent its rear edge is cut out to form a space adapted to receive the forward ends of resilient spring members 121, 123. Springs 121, 123 are rigidly attached in position between block 119 and casing floor 107 and project rearwardly and arch upwardly from the point of attachment with spring 121 overlying spring 123 and with lower spring 123 projecting rearwardly substantially beyond the termination of spring 121. Each of the springs 121, 123 rearward of their attachment to floor 107 arch upwardly with spring 121 terminating in a substantially Y-shaped portion 125, the ends of the arms of spring portion 125 being spaced apart and adapted to engage a face of a razor blade 32 adjacent to but spaced inwardly from the opposite sides of the blade. Spring 123 at its rear end is broadened into an enlarged terminal portion 127, of approximately triangular shape, the triangular spring portion 127 being of a size and shape which is adapted to enter the open bottom of the blade housing magazine of changer 28, the base of the approximately triangular portion 127 being preferably of a length in excess of the spacing between blade apertures 33 so as to engage a substantial portion of the face of a blade 32 seated thereagainst.

Rigidly fixed at their front ends to front wall 103 are a pair of fixed cam members 129, the upper edges of which project above a front wall 103 into entrance 113 and the outer faces of which, adjacent the front wall, are spaced apart slightly less than the spacing between clamp flanges 47 when clamps 43 are in clamping engagement with a blade 32 supported by razor head 26. Cams 129 extend rearwardly from front wall 103 and diverge outwardly toward side walls 101, being rigidly fixed adjacent their rear ends to the respective side walls and terminating intermediate the length of the side walls. It will be observed that the outer faces of the cams 129 are formed along outwardly diverging, preferably undulant lines, the outer surfaces of cams 129 being enabled to function as camming surfaces. Cams 129 are arranged within the casing to lie between clamp flanges 47 when razor head 26 is introduced into entrance 113 and upon rearward movement of razor head 26 through casing 29, the camming surfaces are effective to force flanges 47 and consequently clamps 43 outwardly, moving clamps 43 about pivot bars 41 to effect release of clamping engagement.

Adjacent its rear end each cam 129 is provided with a pocket 131 formed on its inner face and open inwardly of casing 29. Pockets 131 are adapted to receive anchor tabs 98 upon introduction of changer 28 into casing 29 to limit movement of changer 28 relative to casing 29 and to prevent undesired removal of changer 28 from the casing, and for this purpose pockets 131 include top 132, rear 133, bottom 134 and front 135 which cooperate to form a substantially rectangular pocket and are effective to limit vertical and longitudinal movement of anchor tabs 98 relative to the casing wall. It will be observed that in the form of the device illustrated in Fig. 14, pocket rear 133 and pocket bottom 134 may be formed as a portion of a block 129A, being adapted to cooperate with the rearward portion of cams 129 to complete pocket 131. In the alternative, pocket 131 may be formed directly into cam 129 as indicated in Fig. 19.

Each of the side walls 101 adjacent its rear end is provided with a rear fixed cam 137 which includes a forwardly facing, curved cam surface 139 projecting from side walls 101 into the casing interior and curving downwardly from cover members 109 to terminate at its lower end which is seated upon the upper edge of rear wall 105. Rear cams 137 are adapted to engage clamps 43 in released position, such as that shown in Fig. 22, and upon continued rearward movement of the clamps past the rear cams to move the clamps downwardly about pivots 41, effecting reestablishment of clamping engagement of head-carried blade 32 by clamps 43.

In the form of the device illustrated in Fig. 14, in which casing floor 107 is hingedly attached to the casing, releasable catch means are provided to retain floor 107 in closed position. As illustrated, the releasable catch means may consist of sockets 141 respectively formed on the opposite ends of end wall 105 and cooperating spring-loaded ball members 143 retained by suitable retainer rings 145 in side walls 101 adjacent the respective lower rear corners of the side walls, the sockets and balls being adapted to cooperate and releasably retain floor 107 and the parts carried thereby in closed position. Preferably side walls 101 adjacent their lower and rearward edges are provided with stops 147 which are rigidly secured to the respective side walls and which are positioned to abut casing floor 107 and to effect proper positioning of the floor during assembly of the casing. Mounted upon rear wall 105 is a central spacer 149, which extends transversely across casing 29 a distance slightly less than the spacing between flanges 47 with the opposite sides of spacer 149 being equally spaced from the respective side walls 101, to permit passage of clamps 43 in engaged relation with a head-carried blade 32 thereby through exit opening 115.

It will be observed that casing cover 109 is spaced above casing floor 107 and the instrumentalities carried by the floor, to provide an elongated passageway 151 extending from front to rear of the casing 29, and communicating at its opposite ends with entrance 113 and exit 115 and at its top with guide slot 111.

Figures 23, 26:
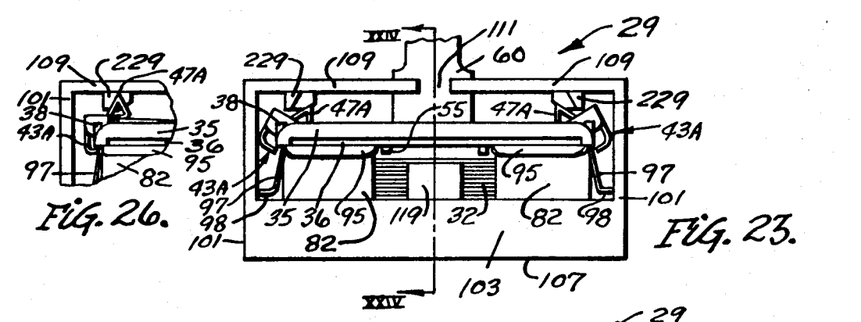
Fig. 23 is a front end view of a variation in the casing adapted for use with the razor blade-supporting head illustrated in Figs. 7 and 8.
Fig. 26 is a fragmentary front end view of the casing shown in Fig. 23 with a razor head at the entrance thereto.
Figure 24:
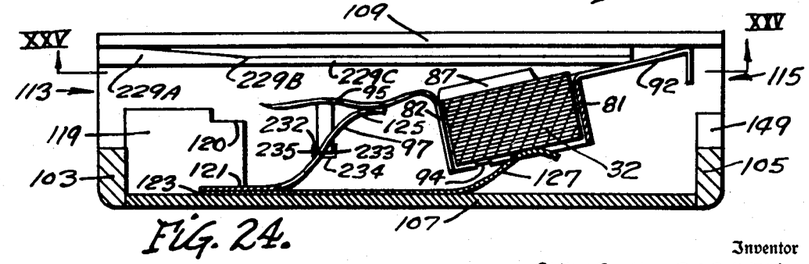
Fig. 24 is a longitudinal sectional view taken on the line XXIV—XXIV of Fig. 23.
Figure 25:
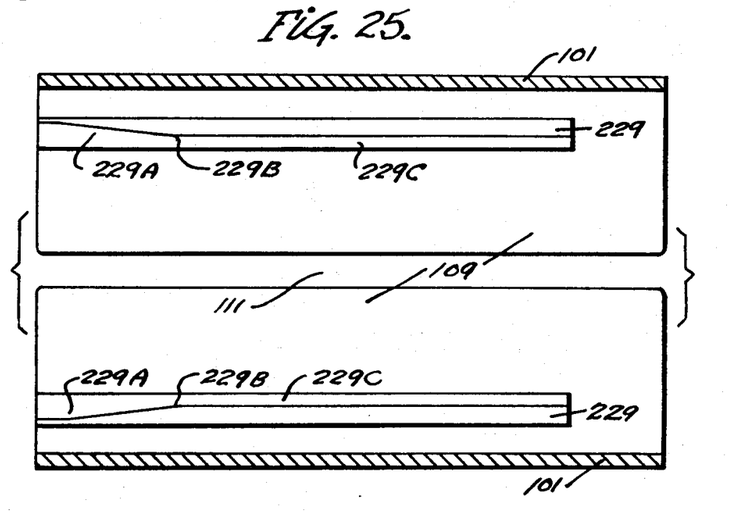
Fig. 25 is an inverted sectional plan view on the line XXV—XXV of Fig. 24.

In Figs. 23 to 25 a variation in casing 29 is illustrated, which variation adapts the casing for use with a razor head 26 on which are mounted clamps 43A, illustrated in Figs.

7 and 8. In this variation each cover member 109 is provided with an elongated cam member 229 which projects downwardly from the underside of cover member 109 into passageway 151 within casing 29 to lie in the path of the angular lugs 47A of clamps 43A as the razor head is moved through casing 29. Each of the cams 229 is provided with an inner camming face, which includes a forward twisted section 229A which at its forward and adjacent front wall 103 is disposed at an angle of inclination from the vertical of substantially thirty degrees and as it extends rearwardly within casing 29 is twisted inwardly to a point of maximum angularity, indicated at 229B, at which point each face 229A has been turned approximately thirty degrees to an angle of inclination from the vertical of substantially sixty degrees. From the point of maximum angularity 229B each cam face extends rearwardly as a flat retaining surface 229C lying in a plane disposed at an angle of inclination from the vertical of substantially sixty degrees. Cams 229 and camming faces 229C, terminate adjacent but spaced forwardly from rear wall 105. With the use of cams 229 and the razor heads of Figs. 7 and 8, cams 129 and 137 heretofore described may be omitted and pockets 234, similar to pockets 131, are formed in side walls 101 to receive and engage anchor tabs 98 upon insertion of blade changer 28 within the casing.

In the fabrication of the devices, changer 28 may be formed with magazine 79, forwardly extending stripper bayonets 95 including anchors 97, and rearwardly extending tongues 92. A plurality of blades 32, arranged in stacked relation, are introduced through the open bottom of magazine 79 and preferably bosses 94 formed in the lower edges of side panels 80 to retain the stacked blades 32 within magazine 79. Blade notches 34 of the magazine contained blades are engaged by indents 85 preventing undesired longitudinal movement of the blade relative to the magazine and thereby preventing contact of the blade cutting edges with the panels of the magazine. The uppermost blade 32 of the stack is in alinement with slots 93 formed in side panels 80 which effect cut-off of the upper portion of indents 85, so that the uppermost blade 32 may, when properly engaged, be moved out of the magazine through discharge opening 91.

Changer 28, with the stacked blades positioned therein, may then be inserted within casing 29 with anchor tabs 98 being inserted in opposite pockets 131 formed in the rearward portion of cam members 129. Floor 107 may then be positioned and secured in relation to the side walls 101 and front and rear walls 103, 105, with the Y-shaped portion 125 of spring 121 underlying and in contact with the under surface of forwardly extending stripper bayonets 95. The substantially triangular portion 127 of spring member 123 underlies magazine 79 with the blades contained in the magazine seated on the spring portion, with the narrow section adjacent the apex of portion 127 underlying the space between front panels 82, as a result of which spring portion 127 may enter the bottom of magazine 79 so that the stacked blades are urged upwardly to maintain the uppermost blade of the stack in contact with the underside of top members 83, and the entire changer mechanism is yieldably supported by the springs in a position angular with respect to the interior of casing 29.

As shown in Fig. 19, the rear end of tongues 92 contact cover members 109 and limit further upward movement of changer 28, which upward movement is constantly urged by spring 123.

It will be seen that stripper bayonets 95, the uppermost blade of blades 32 stacked in magazine 79, and tongues 92, are all positioned to lie in elongated passageway 151 for successive engagement by razor head 26 and parts carried thereby during movement of the razor head through the passageway of casing 29.

With the changer and casing assembled, blade changing operations as desired may be undertaken. In this operation razor head 26 is inverted and introduced through entrance 113 into casing passageway 151. As the razor head enters entrance 113 guide notches 64 are slidably engaged with the inner edges of cover members 109 which define guide slot 111. This engagement of guide notches 64 with the edges of cover members 109 maintains razor head 26 in a constant position relative to casing 29, changer 28, and passageway 151. Razor head 26 may be moved longitudinally rearwardly through passageway 151, moving from front to rear of casing 29 and discharging through exit 115. When the head has been moved rearwardly past front wall 103, blade contacting flanges 47 of clamps 43 are brought into contact with the outer camming surfaces of cams 129. As rearward movement of the head is continued clamps 43 are forced outwardly against the action of spring 57 by the sliding engagement of flanges 47 with the outwardly diverging camming faces of cams 129 moving the clamps to rock outwardly about their respective pivots 41 and effect release of clamping engagement of the used blade 32X carried by head 26. It will be observed that as the clamps are thus moved outwardly about pivots 41 the movement is resisted by spring 57 until the clamps have been moved to a position as illustrated in Fig. 22, in which they have moved beyond center so that thereafter spring 57 is effective to hold the clamps in open position during continued movement of the head.

Just prior to completion of the releasing movement of clamps 43 about pivots 41, stripper bayonets 95 enter between blade 32X and the supporting face of plate 31, effecting the beginning of separation of the blade from the plate, and upon completion of releasing movement of the clamps 43, bayonets 95 are effective during continued rearward movement of razor head 26 while razor head 26 is permitted to pass thereover, studs 55 moving between the transversely spaced inner edges of tongues 95. It will be seen that used blade 32X, removed from razor head 26, is engaged between the arms of Y-shaped spring portion 125 and the under surface of bayonets 95, the used blade or blades being retained therebetween against displacement or interference with the operation of the device. It will also be seen that depending anchors 97 are positioned to lie at the respective opposite ends of separated used blades 32X to limit movement of these blades transverse to casing 29.

As movement of razor head continues rearwardly plate 31 rides over the upwardly arched rearward portion of bayonets 95, displacing magazine 79 against the action of spring 123 and permitting razor head 26 to easily ride over the front ends of upstanding lips 87 and thus onto magazine 79. Studs 55, projecting downwardly from the inverted razor head, ride between upstanding lips 87 which are slidably contacted by plate 31, and studs 55 slide along the upper face of the uppermost of stacked blades 32 within magazine 79. By virtue of the depending length of studs 55 blades 32 within the magazine 79 are depressed during passage of studs 55 over the portion of the uppermost blade of the stack forward of blade apertures 33, spring 123 being restrained and the blades being moved temporarily away from the under side of magazine top members 83 permitting minor downward movement of the magazine. By the arrangement of the magazine and the positioning of stacked blades 32 therein blade apertures 33 are respectively longitudinally alined with the path of movement of studs 55 during passage of head 26 through casing 29, and when studs 55 reach the position in which they are in register with the apertures of the uppermost blade of the stack, the depressing restraint effected by the studs upon the stack of blades is released, and apertures 33 of the uppermost blade of the stack are moved upwardly by spring 123 onto the ends of studs 55 and into face contact with the under surface of top members 83. As further upward movement of the blades is thus limited, studs 55 extend no further than into apertures 33 of the uppermost blade. The uppermost blade is thus picked up by the engagement of studs 55 with its apertures 33 and when thus engaged, end notches 34 of the uppermost blade having moved into alinement with slots 93 so as to be freed from the restraint of indents 85, may be moved rearwardly by studs 55 upon continued rearward movement of razor head 26. The uppermost blade is moved rearwardly through discharge opening 91 of magazine 79 and onto tongues 92, which being carried by rear panel 81 of magazine 79 are urged upwardly by the action of spring 123 and consequently urge the new blade 32, engaged by studs 55, into engagement with the blade supporting face of plate 31 as the plate leaves the rear ends of lips 87.

As the new blade has been carried onto the tongues 92 by studs 55 outer portions 49 of clamps 43 have come into engagement with the downwardly curved cam surfaces 139 of rear cams 137, which, as final rearward movement of the razor head is continued, move clamps 43 downwardly and inwardly about pivots 41 until the clamps have been moved past center and under the action of leaf spring 57 are snapped into closed clamping position in which fingers 48 and the lower edges of flanges 47 are in clamping engagement with the face of new blade 32, holding the blade against the supporting face of plate 31. Razor head 26, with the newly placed blade 32, may then be withdrawn from casing 29 through exit 115.

With the blade thus positioned on head 26 the head may be positioned at a desired position of angularity relative to handle 27 by rocking the head relatively to handle 27 about pivot pin 69, thereby effecting engagement between spring-loaded ball 77 and a selected recess 71.

It will be observed that recesses 71 are provided to enable positioning of the cutting edge of a blade 32 supported on razor head 26 at a position angular to handle 27, which is particularly desirable in the present device, which preferably is employed with double edged blades 32, since it permits the use of one cutting edge of the blade supported at an angular shaving position, and when desired the supported head may be shifted to an opposite angular shaving position for convenient use of the opposite shaving edge. It is additionally found to be convenient to provide the additional recesses 71X, which, when engaged with spring-loaded balls 77 by further rocking movement of head 26 to neck 60 relative to handle 27, position and retain the head and neck substantially at right angles to handle 27, this position being particularly desirable for purposes of storage of the device, as the head thus may be introduced into entrance opening 113 of casing 29 with notches 64 engaging guide slot 111 and handle 27 lying along cover members 109, and supported in this position with a minimum use of space.

When the stack of blades 32 housed in magazine 79 has been exhausted through repeated blade changes, changer 28 and used blades 32X may be removed from casing 29 and a new changer 28 substituted in lieu thereof. In this connection it is particularly convenient to employ the hingedly secured floor 107, as illustrated in Fig. 14, as floor 107, together with springs 121, 123 carried thereby, may be moved downwardly about hinge 117 opening casing 29 and releasing changer 28 therefrom. As heretofore described, the rear 133 and bottom 134 of pocket 131 may be mounted upon a block 129A carried by floor 107, which, upon downward movement of floor 107, release tabs 98 for ready removal of changer 28 from the casing. A new changer 28 may be readily inserted and the casing again closed for further operation. It will be understood that the casing may be opened otherwise for the removal and reception of old and new changers 28 by the displacement of parts other than floor 107, if desired, without departing from this invention. It will further be understood that the feature of providing a displaceable casing member for purposes of gaining access to the casing interior while desirable in many instances may be omitted.

In the operation of the variation in casing as illustrated in Figs. 23 and 26 in connection with the razor head illustrated in Figs. 7 and 8, introduction of razor head 26 into entrance 113 moves angular lugs 47A of clamps 43A into sliding engagement with twisted cam face 229A, which, by virtue of the twist, is enabled to impart a limited rotating motion to lugs 47A during rearward movement of the razor head until razor head has reached the point 229B, at which point clamps 43A will have reached their maximum rotation and complete release of blade 32X effected. In the manner already described, bayonets 95 effect separation of the released blade 32X from head 26 and a new blade is fed to the razor head through the cooperation of magazine 79, spring 123 and studs 55 in the manner already described. During continued rearward movement of razor head 26 clamps 43A are held in open position by camming face 229C against the constant urging of spring 57, which, bearing against seat portions 50A, is constantly urging return movement of clamps 43A into clamping engagement with the razor head. After the razor head and new blade 32 have moved onto tongues 92 the restraint on clamps 43A effected by camming faces 229C is released by the termination of camming faces 229C and spring 57 is effective to move clamps 43A into clamping engagement with blade 32, so that razor head 26 and new blade 32 may be removed from exit 115 of casing 29.

I claim:

1. A unitary blade changing mechanism which includes a magazine positioned intermediate the length of said mechanism for housing a plurality of stacked razor blades, a pair of transversely spaced stripper bayonets each attached at one end to one end of said magazine and extending away from said magazine, said bayonets having their respective opposite ends free and lying substantially in the plane of the top of said magazine to engage and downwardly divert a blade moved toward said magazine, said top having a longitudinal opening to provide access to the uppermost of said stacked blades, and a transverse blade discharge opening adjacent said top facing away from said bayonets and communicating with said longitudinal opening, said longitudinal magazine opening and the spacing between said bayonets being longitudinally alined.

2. A unitary blade changing mechanism which includes a magazine positioned intermediate the length of said mechanism for housing a plurality of stacked razor blades with the cutting edges of said blades extending transversely of said mechanism, a pair of transversely spaced stripper bayonets attached at their rear ends to the front of said magazine and extending forwardly therefrom, said bayonets having their respective front ends free and lying substantially in the plane of the top of said magazine to engage and downwardly divert a blade moved toward said magazine, said top having a longitudinal opening to provide access to the uppermost of said stacked blades, and along the edges of said opening being provided with upstanding lips for limiting said access, a rearwardly facing transverse blade discharge opening adjacent said top communicating with said longitudinal opening, and a pair of transversely spaced tongues secured at their forward ends to and projecting rearwardly from the rear of said magazine below the level of said top, positioned to underlie and support a said blade moved from said magazine, said longitudinal magazine opening and the said spacings, between said bayonets and said tongues being longitudinally alined.

3. Razor blade changing mechanism comprising a blade housing magazine, and stripper means connected to and projecting from one end of the top of said magazine, said magazine having an upstanding transverse wall adjacent the other end of said top, a longitudinal access opening in said top and a transverse discharge opening above said wall communicating with said access opening remote from said stripper means.

4. Razor blade changing mechanism comprising a blade housing magazine, stripper means connected to and projecting from one end of the top of said magazine, and blade supporting means projecting oppositely from the opposite end of the top of said magazine, said magazine having an access opening in said top and a discharge opening communicating with said access opening remote from said stripper means.

5. Razor blade changing mechanism comprising a blade retaining magazine, stripper means connected to and projecting from one end of the top of said magazine, and blade supporting means projecting oppositely from the opposite end of the top of said magazine, said magazine having an access opening in said top and a discharge opening communicating with said access opening remote from said stripper means; and a casing having an elongated passageway, said mechanism being mounted in said casing and projecting into said passageway.

6. Razor blade changing mechanism comprising a blade retaining magazine, stripper means connected to and projecting from one end of the top of said magazine, and blade supporting means projecting oppositely from the opposite end of the top of said magazine, said magazine having an access opening in said top and a discharge opening communicating with said access opening remote from said stripper means; and a casing having an elongated passageway, said mechanism being removably mounted in said casing and projecting into said passageway, a portion of said casing being displaceable for placing and removal of said mechanism.

7. Razor blade changing equipment for removing a razor blade from and supplying a new razor blade to a razor having a blade supporting head, and releasable, blade-attaching side clamps; said equipment comprising a blade changing mechanism including a magazine for housing a plurality of said razor blades in stacked relation, a pair of stripper bayonets connected at one end to and extending away from one end of the top of said magazine, the opposite ends of said bayonets being free, a pair of tongues attached at one end to and extending in the opposite direction away from the opposite end of said magazine adjacent the top of said magazine, said bayonets and said tongues being transversely spaced apart, said top overlying the said blades housed in said magazine and having a longitudinal opening for access to the uppermost said housed blade, said opening being provided along its opposite edges with upstanding lips forming part of and projecting above said top and spaced similarly to said bayonet and tongue spacing, and a blade discharge opening formed in said magazine adjacent and facing toward said tongue member attachment and communicating with said top opening; a casing surrounding and housing said mechanism with said mechanism disposed longitudinally of said casing intermediate the length thereof, said bayonets extending toward one end and said tongues extending toward the other end of said casing, a passageway extending from end to end of said casing, spring means secured to said casing underlying and resiliently supporting said mechanism and urging said bayonets, said top and said tongues into said passageway, part of said spring means engaging said blades housed in said magazine and urging the uppermost said blade into contact with the underside of said top, clamp opening cam means mounted in said casing adjacent said one casing end, clamp closing cam means mounted in said casing adjacent said other casing end, and inwardly open pockets formed in said casing, said mechanism including anchor means forming part of said bayonets intermediate the ends of said bayonets, said anchor means loosely engaging said pockets to limit movement of said mechanism relative to said casing; said passageway being open and of a size to receive said head for movement from end to end within said casing, the first said cam means projecting into said passageway and being positioned to engage said clamps and effect release thereof during an initial portion of said head movement, the free ends of said bayonets being positioned in said passageway in the path of said head to engage said head during said movement and separate a released blade from said head, and guiding said head onto said lips to engage and move said uppermost blade from said discharge opening, said magazine being displaced downwardly by head passage thereover, said tongues underlying a blade moved from said discharge opening and urging said moved blade onto said head, said clamp closing cam means engaging said clamps to effect clamp closure and attachment of said moved blade to said head.

8. Razor blade changing equipment for removing a razor blade from and supplying a new razor blade to a razor having a blade supporting head, and releasable, blade-attaching side clamps; said equipment comprising a blade changing mechanism including a magazine for housing a plurality of said razor blades in stacked relation, a pair of stripper bayonets connected at one end to and extending away from one end of the top of said magazine, the opposite ends of said bayonets being free, a pair of tongues attached at one end to and extending in the opposite direction away from the opposite end of said magazine adjacent the top of said magazine, said bayonets and said tongues being transversely spaced apart, said top overlying the said blades housed in said magazine and having a longitudinal opening for access to the uppermost said housed blade, said opening being provided along its opposite edges with upstanding lips forming part of and projecting above said top and spaced similarly to said bayonet and tongue spacing, and a blade discharge opening formed in said mazagine adjacent and facing toward said tongue attachment and communicating with said top opening; a casing surrounding and housing said mechanism with said mechanism disposed longitudinally of said casing intermediate the length thereof, said bayonets extending toward one end and said tongues extending toward the other end of said casing, a passageway extending from end to end of said casing, spring means secured to said casing underlying and resiliently supporting said mechanism and urging said bayonets, said top and said tongues into said passageway, part of said spring means engaging said blades housed in said magazine and urging the uppermost said blade into contact with the underside of said top, clamp opening means mounted in said casing adjacent said one casing end, and means for loosely attaching said mechanism to said casing; said passageway being open and of a size to receive said head for movement from end to end within said casing, said clamp opening means projecting into said passageway and being positioned to engage said clamps and effect release thereof during an initial portion of said head movement, the free ends of said bayonets being positioned in said passageway in the path of said head to engage said head during said movement and separate a released blade from said head, and guiding said head onto said lips to engage and move said uppermost blade from said discharge opening, said magazine being displaced downwardly by head passage thereover, said tongues underlying a blade moved from said discharge opening and urging said moved blade onto said head.

9. Razor blade equipment adapted for use with a razor blade supporting head having a pair of side clamps for engaging a blade supported on said head, said clamps being rockably attached to said head for movement from and to blade engaging position, which equipment includes a casing having a longitudinal passageway extending from front to rear of the casing to receive and pass a said head for movement longitudinally through said casing, a pair of opposite elongated cams projecting into the path of said head movement through said passageway, each cam having a camming face beginning adjacent the front of said casing positioned to engage a portion of a said clamp carried by a head moved through said casing during an initial portion of said head movement and effect clamp rocking from blade engaging position, each said camming face terminating intermediate the length of said passageway, movement of a cam engaged clamp beyond said termination effecting release of cam engagement for clamp return to blade engaging position, a pair of resilient members fastened to said casing below said passageway and projecting upwardly into said passageway, a blade changer mechanism yieldingly supported by said members projecting into said path of movement, and means for attaching said changer mechanism to said casing.

10. Razor blade equipment adapted for use with a razor blade supporting head having a pair of side clamps for engaging a blade supported on said head, said clamps being rockably attached to said head for movement from and to blade engaging position, which equipment includes a casing having a longitudinal passageway extending from front to rear of the casing to receive and pass a said head for movement longitudinally through said casing, a pair of opposite elongated cams projecting into the path of said head movement through said passageway, each cam having a camming face beginning adjacent the front of said casing positioned to engage a portion of a said clamp carried by a head moved through said casing during an initial portion of said head movement and effect clamp rocking from blade engaging position, each said camming face terminating intermediate the length of said passageway, movement of a cam engaged clamp beyond said termination effecting release of cam engagement for clamp return to blade engaging position.

11. Razor blade equipment adapted for use with a razor blade supporting head having clamp means for engaging a blade supported on said head, said clamp means being attached to said head for movement from and to blade engaging position and including operating means for effecting said clamp movement, which equipment includes a casing having a longitudinal passageway extending from front to rear of the casing to receive and pass a said head for movement longitudinally through said casing, elongated cam means projecting into the path of said operating means through said passageway and being positioned to engage said clamp operating means during said head movement and effect clamp rocking from blade engaging position, said cam means terminating intermediate the length of said passageway, movement of cam engaged clamp operating means beyond said termination effecting release of cam engagement for clamp return to blade engaging position, resilient means fastened to said casing below said passageway and projecting upwardly toward said passageway, and a blade changer mechanism yieldingly supported by said resilient means projecting into said path of head movement.

12. Razor blade equipment adapted for use with a razor blade supporting head having a pair of clamps for engaging a blade supported on said head, said clamps being attached to said head for movement from and to blade engaging position, which equipment includes a casing having a longitudinal passageway extending from front to rear of the casing to receive and pass a said head for movement longitudinally through said casing, a pair of opposite elongated cams extending longitudinally of the casing, each said clamp including operating means for effecting said clamp movement, said cams respectively projecting into the pathway of said operating means through said casing and being positioned to respectively engage said operating means during head movement through said casing and effect said clamp movement from blade engaging position, each said cam terminating forward of the rear end of said casing, movement of a cam engaged operating means beyond said termination effecting release of cam engagement for clamp return to blade engaging position.

13. A blade changing magazine for housing a plurality of stacked razor blades, a pair of transversely spaced stripper bayonets each attached at one end to one end of said magazine and extending away from said magazine, said bayonets having their respective opposite ends free and lying substantially in the plane of the top of said magazine to engage and downwardly divert a blade moved toward said magazine, said top having a longitudinal opening to provide access to the uppermost of said stacked blades, and a transverse blade discharge opening adjacent said top facing away from said bayonets and communicating with said longitudinal opening, said longitudinal magazine opening and the spacing between said bayonets being longitudinally alined.

14. A blade changing magazine for housing a plurality of stacked razor blades, stripper means attached at one end to one end of said magazine and extending away from said magazine, the opposite end of said stripper means being free and lying substantially in the plane of the top of said magazine to engage and downwardly divert a blade moved toward said magazine, said top having a longitudinal opening to provide access to the uppermost of said stacked blades, and a transverse blade discharge opening adjacent said top facing away from said stripper means and communicating with said longitudinal opening.

15. Razor blade changing mechanism comprising a blade retaining magazine, stripper means connected to and projecting from one end of the top of said magazine, said magazine having an upstanding transverse wall adjacent the other end of said top, a longitudinal access opening in said top and a transverse discharge opening above said wall communicating with said access opening remote from said stripper means; and a casing having an elongated passageway, said mechanism being mounted in said casing and projecting into said passageway.

16. Razor blade changing mechanism comprising a blade retaining magazine, stripper means connected to and projecting from one end of the top of said magazine, said magazine having an upstanding transverse wall adjacent the other end of said top, a longitudinal access opening in said top and a transverse discharge opening above said wall communicating with said access opening remote from said stripper means; and a casing, said mechanism being removably mounted in said casing.

17. A blade changer for use with a razor having a blade supporting head, said changer including a casing, a passageway extending from front to back of said casing for receiving and guiding said head, said passageway being open and unobstructed for the passage of said head therethrough in one direction only from the front through the back of said casing, a magazine removably mounted in said casing, means removably connecting said magazine to said casing, and a plurality of blades housed in said magazine in stacked relation, one of said blades being positioned in said passageway for engagement by said head during said head passage through said casing.

18. An automatic blade changer for use with a blade holding head which head includes a blade engaging face and means for removably attaching a blade to said face; said changer including a longitudinal passageway extending from end to end of said changer and being open for the passage of said head therethrough, means associated with and adjacent one end of said passageway for releasing said blade attaching means for removal of a blade from said face during an initial portion of the passage of said head along said passageway, a magazine for containing blades communicating with said passageway intermediate the length of said passageway and extending into the path of said face during an intermediate portion of the passage of said head through said passageway, said magazine being detachably mounted in said passageway, means detachably connecting said magazine in said passageway, and means for urging a magazine contained blade into the path of said face for engagement by said face.

19. Razor blade changing mechanism, adapted for use in a casing, said mechanism comprising a blade housing magazine having a top, stripper means connected to and projecting away from said magazine, and means for removably connecting said mechanism in a casing, said magazine having an upstanding transverse wall adjacent the other end of said top, a longitudinal access opening in said top and a transverse discharge opening above said wall communicating with said access opening remote from said stripper means.

References Cited in the file of this patent

UNITED STATES PATENTS

| | | |
|---|---|---|
| 1,356,627 | Johanson | Oct. 26, 1920 |
| 1,584,811 | Schick | May 18, 1926 |
| 1,859,083 | Gaisman | May 17, 1932 |
| 2,304,314 | Muros | Dec. 8, 1942 |
| 2,309,780 | Muros | Feb. 2, 1943 |
| 2,654,149 | Bowen et al. | Oct. 6, 1953 |